United States Patent [19]

Weaver

[11] 3,998,646
[45] Dec. 21, 1976

[54] PROCESS FOR FORMING HIGH DENSITY SILICON CARBIDE

[75] Inventor: Gerald Q. Weaver, Princeton, Mass.
[73] Assignee: Norton Co., Worcester, Mass.
[22] Filed: Mar. 6, 1975
[21] Appl. No.: 555,855

Related U.S. Application Data

[63] Continuation-in-part of Ser. No. 522,428, Nov. 11, 1974, abandoned.

[52] U.S. Cl. .............................. 106/44; 423/345; 264/66; 264/29.3
[51] Int. Cl.$^2$ .................. C04B 35/52; C04B 35/70
[58] Field of Search ............. 423/439, 345; 264/29, 264/66; 106/44, 39.7

[56] References Cited

UNITED STATES PATENTS

| | | | |
|---|---|---|---|
| 1,916,836 | 6/1933 | Haeuber | 264/66 |
| 2,964,823 | 12/1960 | Fredriksson | 264/301 |
| 3,171,871 | 3/1965 | Watson et al. | 264/29 |
| 3,275,722 | 9/1966 | Popper | 106/44 |
| 3,495,939 | 2/1970 | Forrest | 264/66 |
| 3,836,673 | 9/1974 | Weaver | 423/345 |

FOREIGN PATENTS OR APPLICATIONS

| 42-7249 | 3/1967 | Japan | 423/345 |
|---|---|---|---|

OTHER PUBLICATIONS

Popper, P., ed.; *Special Ceramics 5;* Rogers; M. G., "High-Pressure Slip Casting of Silicon Carbide," (1972) pp. 87–99.
Alliegro, R. A., et al., "Pressure Sintered Silicon Carbide," Journal of the American Ceramics Society, vol. 39, pp. 386–389, (1956).
Forrest, C. W. et al., "The Fabrication and Properties of Self-Bonded Silicon Carbide Bodies," Special Ceramics, vol. 5, pp. 99–123 (1972).

*Primary Examiner*—L. Dewayne Rutledge
*Assistant Examiner*—Michael L. Lewis

[57] ABSTRACT

High density sintered silicon carbide articles are formed by first forming a green blank or billet out of powdered silicon carbide, heat treating the billet to cause it to lightly sinter and become partially densified, shaping the billet to the desired final dimensions and configuration, and fully sintering and densifying the partially sintered shape by heat alone or by heat in the presence of silicon. The product of the process possesses high mechanical strength and may be very fine grained.

9 Claims, No Drawings

PROCESS FOR FORMING HIGH DENSITY SILICON CARBIDE

This applicaton is a continuation in part of application Ser. No. 522,428 filed Nov. 11, 1974 now abandoned.

BACKGROUND OF THE INVENTION

The invention relates to dense silicon carbide bodies. More particularly, the invention relates to a method of forming silicon carbide articles, particularly those of complex shape.

Silicon carbide is not readily amenable to the more conventional cold pressing and sintering processes because the silicon carbide particles will not sinter and densify as will many other refractory materials. However, it has been found that by incorporating minor amounts of certain metals, e.g. boron or aluminum, in the silicon carbide powder, relatively dense silicon carbide bodies can in fact be fabricated by cold pressing a green form followed by sintering. An inherent characteristic of this approach is that the green preform shrinks in size on the order of 15 to 20 percent thus making it impractical, if not impossible, to accurately control the dimensions of the finished article.

Another fabrication technique for forming silicon carbide is the hot-pressing method, such as that described by R. A. Alliegro et al., Journal of the American Ceramics Society, 39, page 386 (1965) or by Weaver et al. in U.S. Pat. No. 3,836,673. In this approach powdered silicon carbide is loaded into a graphite mold and hot-pressed. Hot-pressing produces silicon carbide articles of close to theoretical density and accurate, predetermined dimensions. The only technical shortcoming of the hot-pressing method is that the articles must be of relatively simple geometry. Complex shapes such as a silicon carbide turbine engine rotor, or even the rotor blades, cannot practically be made via the hot-pressing route without final machining.

A third forming method is the so-called reaction sintering or self-bonding process. In general, a body or preform of silicon carbide powder or silicon carbide and a carbonaceous material is made by cold pressing, extruding, isostatic pressing, or the like. The preform is then contacted with silicon metal or silicon vapors at, for example 1700° C, which causes the silicon to enter the interstices of the preform. If carbon is present the silicon will further react with the carbon to form additional silicon carbide. This general method is discussed in some detail by C. W. Forrest et al., in Special Ceramics, 5, page 99 (1972). Among the many variables studied by these workers was the effect on mechanical strength of the particle size of the starting silicon carbide powder. They found that particle size had a profound effect on cross-bending strength down to a particle size of about 100 microns but below that size the effect on strength was much less pronounced. Several permutations of the reaction sintering process have been described in the patent literature. J. C. Andersen in U.S. Pat. No. 2,938,807 describes the forming of dense silicon carbide bodies containing less than 5% free silicon by cold forming a uniform mixture of silicon carbide powder, a carbonaceous material, and a carbonizable material which functions as a temporary binder. The green form is then heat treated to carbonize the carbonizable material followed by a heat treatment at about 2250° C in the presence of silicon metal, resulting in the in situ formation of silicon carbide in the pores of the original preform. Another reaction sintering method is disclosed by K. M. Taylor in U.S. Pat. No. 3,205,043 wherein a green silicon carbide preform is cold pressed from silicon carbide powder containing a small quantity of temporary organic binder, for example a phenolic resin, fired at 2300° C to remove the temporary binder and to recrystallize the silicon carbide. The resulting porous structure is then impregnated with a carbonizable material such as a furfuryl compound or a phenol aldehyde resin and then heat treated to carbonize the organic materials. This latter step is repeated until the carbon content of the silicon carbide preform is 85 to 95 percent of what is needed to react with silicon to fill essentially all of the pores therein. The carbon containing silicon carbide structure is then contacted with silicon metal at about 2200° C. The silicon penetrates the structure and reacts with the carbon to form silicon carbide. According to P. Popper in U.S. Pat. No. 3,275,722 dense self-bonded bodies of silicon carbide are formed by preforming a mixture of silicon carbide powder, powdered carbon, and a temporary binder. The preform is then heated at 1500° C in a vacuum in the presence of silicon vapor, which eliminates the temporary binder and causes the silicon vapor to react with the carbon in the interstices of the silicon carbide-carbon preform. C. W. Forrest describes still another reaction sintering process in U.S. Pat. No. 3,495,939. Forrest forms a porous, coherent body of powdered silicon carbide and carbon, heats the body at from 1600° to 1700° C in an environment of silicon monoxide vapor which increases the surface porosity of the body, and while heating contacts one end of the body with molten silicon. Capillarity draws the molten silicon into the pores of the body forming silicon carbide therein. Still another variant on the reaction sintering approach is that described by U.S. Pat. No. 3,778,231 which is a process for forming sintered silicon nitride articles. In this process, powdered silicon metal is first sintered at 1200° to 1400° C in a nonnitrogen atmosphere, to form a blank or billet which is then machined to the desired shape. The silicon preform is then nitrided by exposure thereof to a nitrogen atmosphere at a temperature of 1180° to 1350° C.

SUMMARY OF THE INVENTION

In its broadest sense the present invention contemplates a method of forming silicon carbide articles of high density and optimum mechanical strength, by first forming a green blank or billet by any of several known techniques; lightly sintering the green billet by heating, preferably in a nitrogen free atmosphere, (which includes a vacuum) causing the silicon carbide billet to partially densify; shaping the billet or blank to the desired configuration by machining, scraping, grinding or the like; and finally fully sintering and densifying the shape by a second heat treatment. The combination of the process for forming the green blank and the first sintering step results in an amount of densification such that the final firing of the shaped article results in a very minor amount of shrinkage. The particle size make-up of the silicon carbide is important for optimizing the advantages of the invention process, and to build into the finished article, optimum mechanical properties. The silicon carbide may be bimodal, in which case at least 50% by weight thereof should be powder with an average particle size of less than 3 microns while the coarser fraction may vary in average particle size up to 170 microns, with a distribution between 30 and 170 microns being preferred. The composition may include, in addition to the silicon carbide, 1 to 15% by weight of boron, aluminum, iron, or silicon metal, or mixtures of these metals.

Alternatively, instead of a straight forward simple sintering approach, the present invention includes the modification of reaction sintering wherein the silicon carbide powder includes 5 to 40% by weight of carbon present either as carbon per se or as a carbonizable material. In this embodiment a green silicon carbide blank is formed containing the requisite amount of carbon, which is then densified and partially sintered by the simultaneous application of heat and pressure; or heating at atmospheric pressure, in a relatively non-oxidizing, nitrogen free atmosphere followed by a second heat treatment in a silicon laden environment, after shaping of the lightly sintered blank, which causes the silicon to permeat the silicon carbide structure and react with the carbon therein to form silicon carbide.

A further compositional modification is that wherein up to 5% by weight of aluminum oxide with an average particle size less than 5 microns, is blended in the silicon carbide powder. This composition then is processed by either of the methods described above.

The resulting product, in all cases, is very dense having a density of at least 98% of theoretical for the composition under consideration, and possesses excellent mechanical strength at room temperature, i.e. having a modulus of rupture of at least 50,000 pounds per square inch.

DESCRIPTION OF THE PREFERRED EMBODIMENTS

In its preferred embodiment, the average particle size of the refractory powders employed and the grain size of the final product is less than 3 microns. However, as mentioned above, the refractory powder and ultimate grain size may include up to 50% by weight of coarser particles viz. particles and grains ranging from 30 to 170 microns, with the finer than 3 micron silicon carbide thus making up not less than 50% by weight of the refractory composition.

Although the present invention contemplates that the light sintering step can be accomplished either by sintering or hot-pressing the latter is preferred. Similarly, although the present process encompasses both simple heating of the shaped article, and reaction sintering to fully sinter and densify said article, reaction sintering is preferred. Thus, a blank or billet may be formed by placing silicon carbide of the appropriate average particle size and containing 5 to 40% by weight of carbon or a carbonizable material in a mold; subjecting the mixture to a pressure of from 1500 to 4000 p.s.i. at a temperature of 1500° to 2000° C, removing the lightly sintered blank from the mold and machining to the desired shape; and, subjecting the shaped blank to an atmosphere of silicon at a temperature of 1500° to 2100° C causing the silicon to permeate the silicon carbide structure reacting with the carbon therein to form silicon carbide in situ and causing final densification of the shaped article. Alternatively, a green blank may be formed of silicon carbide, which may contain 1 to 15% by weight of aluminum, iron, boron, silicon, or mixtures thereof, or up to 5% of aluminum oxide. The green blank is then lightly sintered by subjecting it to a temperature of 1650° to 1970° C at atmospheric pressure. The blank, after cooling and removing from the mold, is machined to the desired shape and given the final densification step of heating at 1850° to 2150° C in a relatively inert atmosphere for up to 3 hours. The resulting finish silicon carbide article, in both cases, has a density of at least 98% of theoretical and the required dimensions, needing no further processing to bring the article within the required dimensional tolerances.

EXAMPLE I

A turbine rotor, 9.75 inches in diameter, was made in the following manner:

3280 Grams of silicon carbide powder having an average particle size of approximately 3 microns, was loaded into a graphoil lined graphite mold which had a 10 inch I.D. and was fitted with a 6 inch arbor. The silicon carbide powder was hot-pressed at 1735° C and 2500 p.s.i. The resulting blank had a 10 inch O.D., a 6 inch I.D., was 2 inches thick, and had a density of 2 g/cc. The blank was then machined into an accurately shaped and sized turbine rotor configuration. The formed and lightly sintered rotor shape was then impregnated with a furfuryl alcohol resin solution (Fapreg P5 manufactured by the Quaker Oats Co.) by soaking overnight in the solution. The impregnant was freed of solvent and polymerized by heat treating at 90° C for 24 hours, 150° C for 6 hours, and 250° C for 2 hours. The rotor shape was then fired at a temperature of 2070° C in a nitrogen atmosphere laden with silicon vapors. As the temperature of the piece was being brought up to 2070° C, the polymerized furfuryl alcohol resin carbonized. When the temperature of the structure reached 2070° C it became permeated with silicon vapors which reacted with the carbon in situ to form silicon carbide in the interstices between the lightly sintered 3 micron silicon carbide particles, with the remaining voids being filled with silicon metal. A fully sintered and densified product resulted which had a density of 3.02 g/cc. The average silicon carbide grain size in the finished rotor was under 3 microns.

EXAMPLE II

A series of spin discs measuring 5.62 inches in diameter, 0.25 inch thick, and having a centrally located 0.87 inch hole, were made as follows:

A mixture of 80% by weight 3 micron silicon carbide and 20% by weight of 325 mesh graphite powder was wet milled in isopropanol for 3 hours. The wet mixture was dried and then ball milled dry for 1 hour. A 190 gram quantity was placed in a graphite mold having an I.D. of 5.62 inches and a 0.25 inch arbor. The mold was assembled and the powder mixture pressed at 1850° C and 3500 p.s.i. to a density of 1.87 g/cc. The hot-pressed disc was then fired at 2070° C in a sintering furnace in contact with molten silicon, all of which was in a nitrogen atmosphere. During the firing, the silicon metal infiltrated the carbon contaning disc and reacted with the carbon to form silicon carbide. The remaining voids were filled with silicon metal. The fully sintered discs had a density of 3.05 g/cc.

It is understood that although the foregoing examples utilize carbon per se or a furfuryl resin as a source of carbon, those methods known in the art wherein carbonizable materials such as phenolic or furfuraldehyde resins or the like are used to introduce carbonizable materials, are also within the scope of the present invention. Such approaches have been briefly described and referenced above in the discussion of the background of the invention. Furthermore, other variations of the invention may become apparent to those skilled in the art which are intended to be within the scope of the invention as defined by the appended claims.

What is claimed is:

1. A method for forming complexly shaped, dense silicon carbide articles comprising the steps of:
    a. forming a green blank comprised of powdered silicon carbide having an average particle size distribution of approximately 50 to 100% by weight of silicon carbide of approximately 3 microns, and 0 to 50% by weight of silicon carbide of 30 to 170 microns;
    b. lightly sintering and partially densifying said green blank;
    c. shaping the lightly sintered blank to a desired machined configuration; and
    d. fully sintering and densifying said machined blank.

2. The method of claim 1 wherein said green blank consists essentially of 85 to 99% by weight of silicon carbide, and 1 to 15% by weight of a metal selected from the group consisting of boron, aluminum, iron, silicon, and mixtures thereof; said blank is partially densified by lightly sintering in a nitrogen free atmosphere, shaped to the desired configuration, and said shaped, lightly sintered blank is fully sintered and densified by further heat treatment at 1850° to 2150° C in a relatively inert atmosphere.

3. The method of claim 1 wherein said green blank consists essentially of 60 to 95% by weight of silicon carbide having an average particle size of less than 3 microns, and 5 to 40% by weight of carbon present as carbon per se or a carbonizable material; said blank is partially densified by lightly sintering through the simultaneous application of heat and pressure; and said shaped and lightly sintered blank is fully sintered and densified by subjecting it to heat and a silicon laden environment, causing the silicon to permeate the lightly sintered structure and react with the carbon therein to form silicon carbide.

4. The method of claim 1 wherein said green blank consists essentially of 85 to 99% by weight of silicon carbide having an average particle size of less than 3 microns, and 1 to 15% by weight of a metal selected from the group consisting of aluminum, boron, iron, silicon, and mixtures thereof; said blank is partially densified by lightly sintering through subjecting said blank to a temperature of 1650° to 1970° C in a vacuum; and said shaped and lightly sintered blank is fully sintered and densified by subjecting it to heat of 1850° to 2150° C in a relatively inert atmosphere.

5. The method of claim 1 wherein said green blank consists essentially of 60 to 95% by weight of silicon carbide having an average particle size of less than 3 microns, and 5 to 40% by weight of carbon present as carbon per se or a carbonizable material; said blank is partially densified by lightly sintering through subjecting said blank to a temperature of 1650° to 1850° C at atmospheric pressure; and said shaped and lightly sintered blank is fully sintered and densified by subjecting it to heat and a silicon laden environment, causing the silicon to permeate the lightly sintered structure and react with the carbon therein to form silicon carbide.

6. The method of claim 2 wherein said green blank includes 1 to 5% by weight of aluminum oxide having an average particle size of less than 5 microns.

7. The method of claim 3 wherein said green blank includes 1 to 5% by weight of aluminum oxide having an average particle size of less than 5 microns.

8. The method of claim 4 wherein said green blank includes 1 to 5% by weight of aluminum oxide having an average particle size of less than 5 microns.

9. The method of claim 5 wherein said green blank includes 1 to 5% by weight of aluminum oxide having an average particle size of less than 5 microns.

* * * * *